United States Patent
Paulino

(10) Patent No.: US 10,329,939 B2
(45) Date of Patent: Jun. 25, 2019

(54) BLADE TIP CLEARANCE CONTROL SYSTEM INCLUDING BOAS SUPPORT

(71) Applicant: UNITED TECHNOLOGIES CORPORATION, Hartford, CT (US)

(72) Inventor: Jose R. Paulino, Saco, ME (US)

(73) Assignee: UNITED TECHNOLOGIES CORPORATION, Hartford, CT (US)

( * ) Notice: Subject to any disclaimer, the term of this patent is extended or adjusted under 35 U.S.C. 154(b) by 596 days.

(21) Appl. No.: 15/021,903

(22) PCT Filed: Sep. 12, 2014

(86) PCT No.: PCT/US2014/055416
§ 371 (c)(1),
(2) Date: Mar. 14, 2016

(87) PCT Pub. No.: WO2015/038906
PCT Pub. Date: Mar. 19, 2015

(65) Prior Publication Data
US 2016/0230583 A1  Aug. 11, 2016

Related U.S. Application Data

(60) Provisional application No. 61/876,999, filed on Sep. 12, 2013.

(51) Int. Cl.
*F01D 11/20* (2006.01)
*F01D 9/04* (2006.01)
(Continued)

(52) U.S. Cl.
CPC ............. *F01D 11/20* (2013.01); *F01D 5/12* (2013.01); *F01D 5/22* (2013.01); *F01D 9/04* (2013.01); *F01D 9/041* (2013.01); *F01D 11/005* (2013.01); *F01D 11/008* (2013.01); *F01D 25/24* (2013.01); *F16J 15/0887* (2013.01); *F05D 2220/32* (2013.01); *F05D 2230/60* (2013.01); *F05D 2240/11* (2013.01); *F05D 2240/57* (2013.01);
(Continued)

(58) Field of Classification Search
CPC .................................. F01D 11/20; F01D 11/14
See application file for complete search history.

(56) References Cited

U.S. PATENT DOCUMENTS 3,966,356 A   6/1976  Irwin
4,679,981 A * 7/1987  Guibert .................. F01D 11/08
                                                 415/116
(Continued)

OTHER PUBLICATIONS

The International Preliminary Report on Patentability for PCT Application No. PCT/US2014/055416, dated Mar. 24, 2016.

(Continued)

*Primary Examiner* — Justin D Seabe
*Assistant Examiner* — Juan G Flores
(74) *Attorney, Agent, or Firm* — Carlson, Gaskey & Olds, P.C.

(57) ABSTRACT

This disclosure relates to a gas turbine engine including a blade outer air seal (BOAS) mounted radially outwardly of a blade. The engine further includes a BOAS support. A radial dimension of the BOAS support is selectively changeable in response to a flow of fluid through the BOAS support to adjust a radial position of the BOAS relative to the blade.

17 Claims, 3 Drawing Sheets

(51) Int. Cl.
- *F01D 11/00* (2006.01)
- *F01D 5/22* (2006.01)
- *F01D 5/12* (2006.01)
- *F01D 25/24* (2006.01)
- *F16J 15/08* (2006.01)

(52) U.S. Cl.
CPC ...... *F05D 2250/71* (2013.01); *F05D 2250/75* (2013.01); *F05D 2270/303* (2013.01); *F05D 2270/306* (2013.01)

(56) References Cited

U.S. PATENT DOCUMENTS

| | | | |
|---|---|---|---|
| 5,116,199 A * | 5/1992 | Ciokajlo | F01D 11/24 415/116 |
| 5,281,085 A | 1/1994 | Lenahan et al. | |
| 5,971,703 A | 10/1999 | Bouchard | |
| 5,993,150 A | 11/1999 | Liotta et al. | |
| 6,170,831 B1 | 1/2001 | Bouchard | |
| 6,368,054 B1 | 4/2002 | Lucas | |
| 6,666,645 B1 | 12/2003 | Arilla et al. | |
| 7,165,937 B2 | 1/2007 | Dong et al. | |
| 7,195,452 B2 | 3/2007 | Allan et al. | |
| 7,600,967 B2 | 10/2009 | Pezzetti, Jr. et al. | |
| 7,704,039 B1 | 4/2010 | Liang | |
| 7,819,622 B2 | 10/2010 | Paulino et al. | |
| 8,342,798 B2 * | 1/2013 | Floyd, II | F01D 11/24 415/115 |
| 2010/0303612 A1 | 12/2010 | Bhatnagar et al. | |
| 2011/0027068 A1 * | 2/2011 | Floyd, II | F01D 11/24 415/13 |
| 2011/0044802 A1 | 2/2011 | Di Paola et al. | |

OTHER PUBLICATIONS

Supplementary European Search Report for European Application No. 14844763.4 dated Nov. 30, 2016.

* cited by examiner

BLADE TIP CLEARANCE CONTROL SYSTEM INCLUDING BOAS SUPPORT

STATEMENT REGARDING GOVERNMENT SUPPORT

This invention was made with government support under Contract No. FA8650-09-D-2923 0021 awarded by the United States Air Force. The government has certain rights in this invention.

BACKGROUND

Gas turbine engines include turbine blades configured to rotate and extract energy from hot combustion gases that are communicated through the gas turbine engine. An outer casing of an engine static structure of the gas turbine engine may include one or more blade outer air seals (BOAS) that provide an outer radial flow path boundary for the hot combustion gases.

SUMMARY

One exemplary embodiment of this disclosure relates to a gas turbine engine. The engine includes a blade outer air seal (BOAS) mounted radially outwardly of a blade, and a BOAS support. A radial dimension of the BOAS support is selectively changeable in response to a flow of fluid through the BOAS support to adjust a radial position of the BOAS support relative to the blade.

In a further embodiment of any of the foregoing, the BOAS support includes an inlet opening in a radially outer surface thereof, and an outlet opening in a radially outer surface thereof.

In a further embodiment of any of the foregoing, the BOAS support includes a first chamber in communication with the inlet opening, and a second chamber in communication with the outlet opening. The first chamber in communication with the second chamber by way of an axial passageway.

In a further embodiment of any of the foregoing, the engine includes an engine case. The engine case includes an inlet opening and an outlet opening aligned with a respective one of the inlet opening and outlet opening of the BOAS support.

In a further embodiment of any of the foregoing, the engine includes a seal provided between a radially outer surface of the BOAS support and the engine case.

In a further embodiment of any of the foregoing, the BOAS support is axially positioned between a first vane support and a second vane support.

In a further embodiment of any of the foregoing, the engine includes a first seal provided between a fore surface of the BOAS support and the first vane support, and a second seal provided between an aft surface of the BOAS support and the second vane support.

In a further embodiment of any of the foregoing, wherein the BOAS support includes at least three circumferentially spaced-apart flanges engaging a respective slot formed in the engine case to restrict circumferential movement of the BOAS support relative to the engine case.

In a further embodiment of any of the foregoing, the flange includes a circumferential surface configured to contact a circumferential surface of the slot in at least one condition.

In a further embodiment of any of the foregoing, the radial dimension of the BOAS support is changeable in response to a change in one of a temperature and a mass flow rate of the flow of fluid introduced into the BOAS support.

Another exemplary embodiment of this disclosure relates to a blade outer air seal (BOAS) support include at least one flange extending from a radially outer surface of the BOAS support. The at least one flange is configured to radially support the BOAS support relative to an engine case, and to allow a radial dimension of the BOAS support to change.

In a further embodiment of any of the foregoing, the at least one flange includes three circumferentially spaced-apart flanges.

In a further embodiment of any of the foregoing, the BOAS support includes an inlet opening in a radially outer surface thereof, and an outlet opening in a radially outer surface thereof.

In a further embodiment of any of the foregoing, the BOAS support includes a first chamber in communication with the inlet opening, and a second chamber in communication with the outlet opening. The first chamber is in communication with the second chamber by way of an axial passageway.

In a further embodiment of any of the foregoing, the radial dimension of the BOAS support is changeable in response to a change in one of a temperature and a mass flow rate of a fluid introduced into the BOAS support.

Another exemplary embodiment of this disclosure relates to a method for regulating tip clearance. The method includes regulating a clearance between a BOAS and a tip of a blade by changing a radial dimension of the BOAS support. The method further includes introducing fluid into a blade outer air seal (BOAS) support to change the radial dimension of the BOAS support.

In a further embodiment of any of the foregoing, the method includes selectively changing the radial dimension of the BOAS support by changing one of a temperature and a mass flow rate of the fluid introduced into the BOAS support.

In a further embodiment of any of the foregoing, the method includes increasing the radial dimension of the BOAS support in response to one of an increase in the temperature and a decrease in the mass flow rate of the fluid.

In a further embodiment of any of the foregoing, the method includes decreasing the radial dimension of the BOAS support in response to one of a decrease in the temperature and an increase in the mass flow rate of the fluid.

In a further embodiment of any of the foregoing, the fluid introduced into the BOAS support is a relatively lower temperature than a fluid introduced into the BOAS.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE DRAWINGS

The drawings can be briefly described as follows.

DETAILED DESCRIPTION

Figure 1:
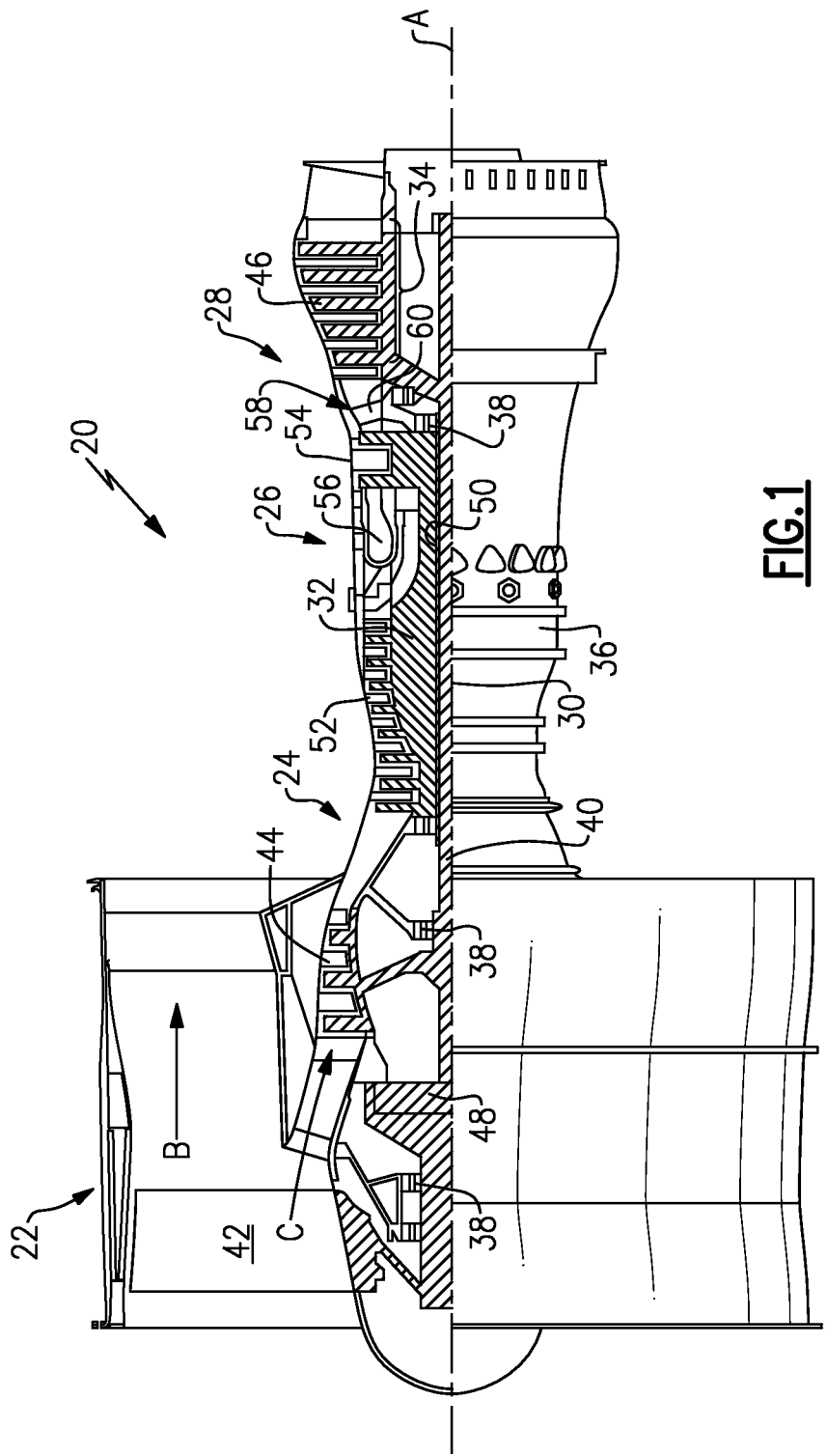
FIG. 1 illustrates a schematic, cross-sectional view of an example gas turbine engine.

FIG. 1 schematically illustrates an example gas turbine engine 20 that includes a fan section 22, a compressor section 24, a combustor section 26, and a turbine section 28. Alternative engines might include an augmenter section (not shown) among other systems or features. The fan section 22 drives air along a bypass flow path B while the compressor section 24 draws a core airflow C along a core flow path where air is compressed and communicated to a combustor section 26. In the combustor section 26, air is mixed with fuel and ignited to generate a high pressure exhaust gas stream that expands through the turbine section 28 where energy is extracted and utilized to drive the fan section 22 and the compressor section 24.

Although the disclosed non-limiting embodiment depicts a turbofan gas turbine engine, it should be understood that the concepts described herein are not limited to use with turbofans as the teachings may be applied to other types of turbine engines; for example a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section. The concepts disclosed herein can further be applied outside of gas turbine engines.

The example engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that connects a fan 42 and a low pressure (or first) compressor section 44 to a low pressure (or first) turbine section 46. The inner shaft 40 drives the fan 42 through a speed change device, such as a geared architecture 48, to drive the fan 42 at a lower speed than the low speed spool 30. The high speed spool 32 includes an outer shaft 50 that interconnects a high pressure (or second) compressor section 52 and a high pressure (or second) turbine section 54. The inner shaft 40 and the outer shaft 50 are concentric and rotate via the bearing systems 38 about the engine central longitudinal axis A.

A combustor 56 is arranged between the high pressure compressor 52 and the high pressure turbine 54. In one example, the high pressure turbine 54 includes at least two stages to provide a double stage high pressure turbine 54. In another example, the high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about five (5). The pressure ratio of the example low pressure turbine 46 is measured prior to an inlet of the low pressure turbine 46 as related to the pressure measured at the outlet of the low pressure turbine 46 prior to an exhaust nozzle.

A mid-turbine frame 58 of the engine static structure 36 is arranged generally between the high pressure turbine 54 and the low pressure turbine 46. The mid-turbine frame 58 further supports bearing systems 38 in the turbine section 28 as well as setting airflow entering the low pressure turbine 46.

The core airflow C is compressed by the low pressure compressor 44 then by the high pressure compressor 52 mixed with fuel and ignited in the combustor 56 to produce high speed exhaust gases that are then expanded through the high pressure turbine 54 and low pressure turbine 46. The mid-turbine frame 58 includes vanes 60, which are in the core airflow C and function as an inlet guide vane for the low pressure turbine 46. Utilizing the vane 60 of the mid-turbine frame 58 as the inlet guide vane for low pressure turbine 46 decreases the length of the low pressure turbine 46 without increasing the axial length of the mid-turbine frame 58. Reducing or eliminating the number of vanes in the low pressure turbine 46 shortens the axial length of the turbine section 28. Thus, the compactness of the gas turbine engine 20 is increased and a higher power density may be achieved.

The disclosed gas turbine engine 20 in one example is a high-bypass geared aircraft engine. In a further example, the gas turbine engine 20 includes a bypass ratio greater than about six (6), with an example embodiment being greater than about ten (10). The example geared architecture 48 is an epicyclical gear train, such as a planetary gear system, star gear system or other known gear system, with a gear reduction ratio of greater than about 2.3.

In one disclosed embodiment, the gas turbine engine 20 includes a bypass ratio greater than about ten (10:1) and the fan diameter is significantly larger than an outer diameter of the low pressure compressor 44. It should be understood, however, that the above parameters are only exemplary of one embodiment of a gas turbine engine including a geared architecture and that the present disclosure is applicable to other gas turbine engines.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ('TSFC')"—is the industry standard parameter of pound-mass (lbm) of fuel per hour being burned divided by pound-force (lbf) of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.50. In another non-limiting embodiment the low fan pressure ratio is less than about 1.45.

"Low corrected fan tip speed" is the actual fan tip speed in ft/sec divided by an industry standard temperature correction of $[(Tram\ °R)/(518.7°R)]^{0.5}$. The "Low corrected fan tip speed," as disclosed herein according to one non-limiting embodiment, is less than about 1150 ft/second.

Figure 2:
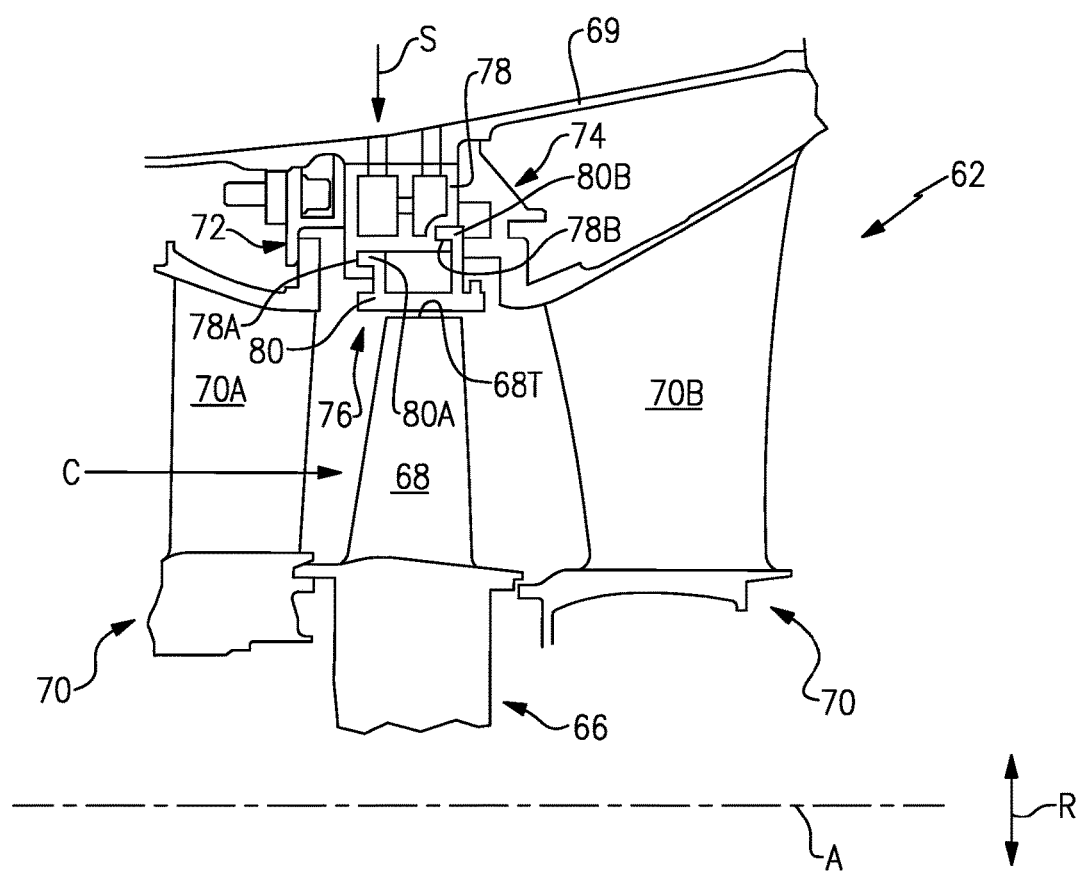
FIG. 2 illustrates a cross-section of a portion of the gas turbine engine of FIG. 1.

FIG. 2 illustrates a portion 62 of the gas turbine engine 20 within a high pressure turbine 54. However, it should be understood that other portions of the gas turbine engine 20 could benefit from the teachings of this disclosure, including but not limited to the fan section 22, the compressor section 24 and the low pressure turbine 46.

In this embodiment, a rotor disc 66 (only one shown, although multiple discs could be axially disposed within the portion 62) is mounted for rotation about the engine central longitudinal axis A. The portion 62 includes an array of rotating blades 68 (mounted to the rotor disc 66) positioned axially between arrays of vane assemblies 70. The vane assemblies 70 each include a plurality of vanes 70A, 70B that are supported relative to an outer casing 69 of the engine static structure 36 (FIG. 1) by way of first and second vane supports 72, 74.

Each blade 68 mounted to the rotor disc 66 includes a blade tip 68T at radially outermost portion thereof. As referred to herein, the radial direction R is normal to the engine central longitudinal axis A. The rotor disc 66 is arranged such that the blade tip 68T is located adjacent a blade outer air seal (BOAS) assembly 76. The BOAS assembly 76 may find beneficial use in many industries including aerospace, industrial, electricity generation, naval propulsion, pumps for gas and oil transmission, aircraft propulsion, vehicle engines and stationary power plants.

The BOAS assembly 76 is disposed in an annulus radially between the outer casing 69 and the blade tip 68T. The BOAS assembly 76 in this example includes a BOAS support 78 and a multitude of BOAS segments 80 (only one shown in FIG. 2). The BOAS segments 80 may be arranged to form a full ring hoop assembly that circumferentially surrounds the associated blade 68. The BOAS support 78 is mounted radially inward from the outer casing 69, and includes forward and aft flanges 78A, 78B that receive forward and aft flanges 80A, 80B of the BOAS segments 80. In one example, a single BOAS support 78 provides a full hoop (or, full ring) around the engine central longitudinal axis A. Providing the BOAS support 78 as a full hoop restricts radial inward movement of the BOAS support 78. The detail of the BOAS support 78, including the manner in which the BOAS support 78 is mounted relative to the portion 62 of the engine 20 is illustrated in detail in FIG. 3.

Figure 3:
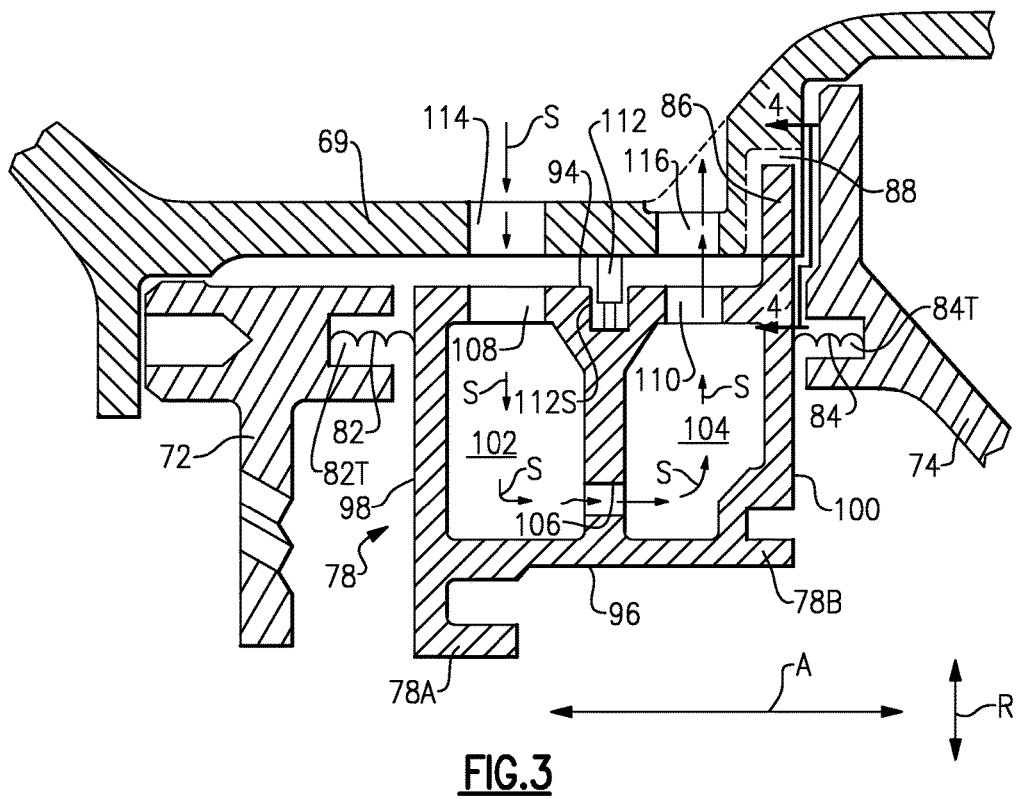
FIG. 3 is a close-up view of a portion of FIG. 2, and illustrates the detail of a BOAS support according to this disclosure.

As illustrated in FIG. 3, the BOAS support 78 is provided axially between a first, forward vane support 72, and a second, aft vane support 74. The BOAS support 78 is provided radially inward of an outer casing 69. It should be understood that the BOAS support 78 may be formed by casting, or by an additive manufacturing process. Other manufacturing techniques can be used to form the BOAS support 78, however.

In this example, a first seal 82 is provided between the first vane support 72 and the BOAS support 78, and a second seal 84 is provided axially between the second vane support 74 and the BOAS support 78. While only one of each of the first and second seals 82, 84 is illustrated, additional, redundant seals may be provided if desired.

The BOAS support 78 is radially supported relative to the outer casing 69 in this example by way of a plurality of flanges 86A-86C. The detail of the flanges 86A-86C is illustrated in FIG. 4, which is a view taken along line 4-4 in FIG. 3.

Figure 4:
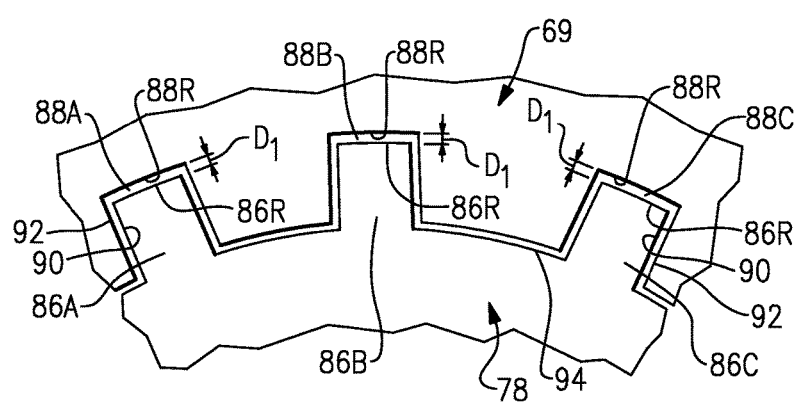
FIG. 4 is a view taken along line 4-4 in FIG. 3.

As shown in FIG. 4, a plurality of circumferentially spaced-apart flanges 86A-86C extend radially outward, in a direction substantially normal to the engine central longitudinal axis A, from a radially outer surface 94 of the BOAS support 78. The outer casing 69 similarly includes a plurality of radially extending slots 88A-88C. The flanges 86A-86C are received in a corresponding one of the slots 88A-88C such that, in at least one condition, a radially outer surface 86R of the each of the flanges 86A-86C is spaced by a distance $D_1$ from an radially outer surface 88R of the slot 88A-88C to provide room to accommodate any relative expansion between the BOAS support 78 and the outer casing 69.

The outer flanges 86A, 86C also serve to circumferentially restrict movement of the BOAS support 78 relative to the outer casing 69, by way of the outer circumferential faces 90 thereof. The outer circumferential faces 90 of the outer flanges 86A, 86C engage corresponding outer circumferential faces 92 of the outer slots 88A, 88C to restrict circumferential movement (e.g., such that the BOAS support 78 is provided substantially concentric with the outer casing 69). While three flanges 86A-86C and three slots 88A-88C are illustrated, it should be understood that any number of flanges and slots can be included. For instance, some examples may only include the outer flanges 86A, 86C while omitting the middle flange 86B. Other examples may include greater numbers of flanges and slots, on the order of six or eight.

With reference back to FIG. 3, the BOAS support 78 generally includes a radially outer surface 94 adjacent the flange 86, a radially inner surface 96 adjacent the forward and aft attachment flanges 78A, 78B, a fore surface 98, and an aft surface 100. The various surfaces 94, 96, 98, 100 of the BOAS support 78 may optionally be coated with a thermal barrier coating (TBC) to insulate the BOAS support from the relatively hot gases adjacent the BOAS 80.

The fore surface 98 contacts the first seal 82, and the aft surface 100 contacts the second seal 84. In this example, the first and second seals 82, 84 each include at least one trough 82T, 84T facing radially inward to substantially prevent the relatively high temperature and high pressure BOAS cooling flow from interacting with the BOAS support 78. Here, the first and second seals 82, 84 each include three troughs 82T, 84T. It should be understood that different types of seals, including seals with different numbers of troughs, come within the scope of this disclosure.

The BOAS support 78 further includes a first chamber 102 and a second chamber 104. The first and second chambers 102, 104 are in communication with one another via an axial passageway 106. The first and second chambers 102, 104 may include turbulators, such as trip strips or pedestals, to increase heat transfer. The radially outer surface 94 of the BOAS support 78 includes an inlet opening 108 in communication with the first chamber 102, and an exit opening 110 in communication with the second chamber 104.

A third seal 112 is provided axially between the inlet opening 108 and the exit opening 110, and further extends in a radial direction R from a seat 112S formed in the radially outer surface 94 to the outer casing 69. In this example, the seal 112 is a piston ring seal, although different seals come within the scope of this disclosure. The outer casing 69 further includes inlet and outlet openings 114, 116 axially and circumferentially aligned with the inlet and outlet openings 108, 110 of the BOAS support 78.

During operation, a cooling flow S enters the inlet 114 in the outer casing 69, and flows into the inlet 108 in the BOAS support 78. The cooling flow S travels circumferentially through the first chamber 102, and is next directed from the first chamber 102 to the second chamber 104 via the axial passageway 106. The cooling flow S then travels circumferentially through the second chamber 104, and finally passes out the exit openings 110 and 116. The seal 112 prevents intermixing between the cooling flow S entering the BOAS support 78 and that exiting the BOAS support 78.

In one example, the cooling flow S is relatively low pressure air. This low pressure air reduces the work required to generate such air. This air may further be relatively cool (e.g., low temperature). In the example, the cooling flow S is relatively low pressure and low temperature compared to a flow of fluid used to cool the BOAS 80. In the event of a seal failure (e.g., a failure of one of the seals 82, 84), the BOAS support 78 will be cooled by the fluid intended to cool the BOAS 80, which still provides adequate cooling. In one example, the engine 20 includes a dedicated supply of fluid providing the cooling flow S. For example, the cooling flow S may be sourced from a fan bypass air. In this example, a valve may be introduced into the engine 20 to selectively tap air from a selected location for use in cooling the BOAS support 78. Downstream of the BOAS support 78, the cooling flow S is routed to an even lower pressure location, such as a third fluid flow stream. In another example, cooling flow S is tapped from an existing cooling system for another component of the engine 20, such as that of a downstream vane or nozzle.

During engine operation, it is extremely important to regulate the clearance of the blade tips 68T relative to the BOAS segments 80. For example, if the clearance between the blade tips 68T and the BOAS segments 80 is too large, the engine 20 will operate inefficiently. On the other hand, if the clearance is too small, there may be excessive rubbing between the blades 68 and the BOAS segments 80 which can increase wear on the engine components. The tip clearance is monitored in some examples by direct measuring (e.g., by way of sensors), and in other examples by monitoring the efficiency of the engine 20.

In either case, the temperature or mass flow rate of the cooling flow S may be selectively changed (e.g., by selecting an alternate source for the cooling flow S, or by selectively mixing sources of fluid to provide the cooling flow S), to either radially expand (e.g., radially outward movement) or contract (e.g., radially inward movement) the BOAS support 78, thus changing the radial dimension of the BOAS support 78.

For example, if the clearance is too small, a relatively higher temperature cooling flow S (or, a reduced mass flow rate) would be introduced into the BOAS support 78 to expand the BOAS support 78, and increase the radial dimension thereof, essentially moving the BOAS support 78 away from the central longitudinal axis A. On the other hand, if the clearance is too large, a relatively low temperature cooling flow S (or, an increased mass flow rate) would be used to contract the BOAS support 78 and reduce the radial dimension thereof (moving the BOAS support 78 toward the central longitudinal axis A). The change in the radial dimension of the BOAS support 78 will correspond to a change in the radial clearance between the BOAS segments 80 and the blade tips 68T.

In addition to requiring a reduced work to provide the cooling flow S, this disclosure has the added benefit of having relatively few moving parts and being lightweight relative to other types of clearance control systems. Accordingly, this disclosure provides an effective, and inexpensive tip clearance regulation system.

Although the different examples have the specific components shown in the illustrations, embodiments of this disclosure are not limited to those particular combinations. It is possible to use some of the components or features from one of the examples in combination with features or components from another one of the examples.

One of ordinary skill in this art would understand that the above-described embodiments are exemplary and non-limiting. That is, modifications of this disclosure would come within the scope of the claims. Accordingly, the following claims should be studied to determine their true scope and content.

What is claimed is:

1. A gas turbine engine, comprising:
   a blade outer air seal (BOAS) mounted radially outwardly of a blade;
   a BOAS support, wherein a radial dimension of the BOAS support is selectively changeable in response to a flow of fluid through the BOAS support to adjust a radial position of the BOAS relative to the blade;
   wherein the BOAS support includes a flange received in a slot formed in an engine case, and wherein a radially outer surface of the flange is spaced from a radially outer surface of the slot in at least one condition,
   wherein the BOAS support includes at least three circumferentially spaced-apart flanges engaging a respective slot formed in the engine case to restrict circumferential movement of the BOAS support relative to the engine case,
   wherein each of the at least three circumferentially spaced-apart flanges extends radially outboard in a direction substantially normal to an engine central longitudinal axis from the radially outer surface of the BOAS support, and
   wherein an outer circumferential face of at least two of the circumferentially spaced-apart flanges are configured to engage outer circumferential faces of a respective slot.

2. The gas turbine engine as recited in claim 1, wherein the BOAS support includes an inlet opening in a radially outer surface thereof, and an outlet opening in a radially outer surface thereof.

3. The gas turbine engine as recited in claim 2, wherein the BOAS support includes a first chamber in communication with the inlet opening, a second chamber in communication with the outlet opening, the first chamber in communication with the second chamber by way of an axial passageway.

4. The gas turbine engine as recited in claim 2, including an engine case, the engine case including an inlet opening and an outlet opening aligned with a respective one of the inlet opening and outlet opening of the BOAS support.

5. The gas turbine engine as recited in claim 4, including a seal provided between a radially outer surface of the BOAS support and the engine case.

6. The gas turbine engine as recited in claim 1, wherein the BOAS support is axially positioned between a first vane support and a second vane support.

7. The gas turbine engine as recited in claim 6, including a first seal is provided between a fore surface of the BOAS support and the first vane support, and including a second seal is provided between an aft surface of the BOAS support and the second vane support.

8. The gas turbine engine as recited in claim 1, wherein the radial dimension of the BOAS support is changeable in response to a change in one of a temperature and a mass flow rate of the flow of fluid introduced into the BOAS support.

9. A blade outer air seal (BOAS) support, comprising:
   at least one flange extending from a radially outer surface of the BOAS support, the at least one flange configured to radially support the BOAS support relative to an engine case, and the at least one flange configured to allow a radial dimension of the BOAS support to change,
   wherein the BOAS support includes at least three circumferentially spaced-apart flanges configured to engage a respective slot formed in the engine case to restrict circumferential movement of the BOAS support relative to the engine case,
   wherein each of the at least three circumferentially spaced-apart flanges extends radially outboard in a direction substantially normal to an engine central longitudinal axis from the radially outer surface of the BOAS support, and wherein an outer circumferential face of at least two of the circumferentially spaced-apart flanges are configured to engage outer circumferential faces of a respective slot.

10. The BOAS support as recited in claim 9, including an inlet opening in a radially outer surface thereof, and an outlet opening in a radially outer surface thereof.

11. The BOAS support as recited in claim 10, including a first chamber in communication with the inlet opening, and a second chamber in communication with the outlet opening, the first chamber in communication with the second chamber by way of an axial passageway.

12. The BOAS support as recited in claim 9, wherein the radial dimension of the BOAS support is changeable in response to a change in one of a temperature and a mass flow rate of a fluid introduced into the BOAS support.

13. A method for regulating tip clearance, comprising:

regulating a clearance between a blade outer air seal (BOAS) and a tip of a blade by changing a radial dimension of a BOAS support;

introducing fluid into the BOAS support to change the radial dimension of the BOAS support, wherein the BOAS support includes at least three circumferentially spaced-apart flanges;

engaging the at least three circumferentially spaced-apart flanges with a respective slot formed in an engine case to restrict circumferential movement of the BOAS support relative to the engine case; and engaging an outer circumferential face of at least two of the circumferentially spaced-apart flanges with outer circumferential faces of a respective slot.

14. The method as recited in claim 13, including selectively changing the radial dimension of the BOAS support by changing one of a temperature and a mass flow rate of the fluid introduced into the BOAS support.

15. The method as recited in claim 14, including increasing the radial dimension of the BOAS support in response to one of an increase in the temperature and a decrease in the mass flow rate of the fluid.

16. The method as recited in claim 14, including decreasing the radial dimension of the BOAS support in response to one of a decrease in the temperature and an increase in the mass flow rate of the fluid.

17. The method as recited in claim 13, wherein the fluid introduced into the BOAS support is a relatively lower temperature than a fluid introduced into the BOAS.

* * * * *